United States Patent
Garg et al.

(10) Patent No.: US 7,449,167 B2
(45) Date of Patent: Nov. 11, 2008

(54) CATALYST AND PROCESS FOR IMPROVING THE ADIABATIC STEAM-REFORMING OF NATURAL GAS

(75) Inventors: Diwakar Garg, Emmaus, PA (US); Shankar Nataraj, Allentown, PA (US); Kevin Boyle Fogash, Wescosville, PA (US); James Richard O'Leary, Allentown, PA (US); William Robert Licht, Allentown, PA (US); Sanjay Mehta, Alburtis, PA (US); Eugene S. Genkin, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 897 days.

(21) Appl. No.: 10/888,658

(22) Filed: Jul. 8, 2004

(65) Prior Publication Data

US 2006/0008413 A1    Jan. 12, 2006

(51) Int. Cl.
*B01J 8/02* (2006.01)
*C01B 3/26* (2006.01)
*B01J 23/755* (2006.01)

(52) U.S. Cl. ........................ 423/654; 422/211; 423/653; 502/337

(58) Field of Classification Search ............... 423/650, 423/651, 652, 653, 654; 502/337; 422/211
See application file for complete search history.

(56) References Cited

U.S. PATENT DOCUMENTS

| | | | | |
|---|---|---|---|---|
| 3,436,358 | A * | 4/1969 | Poul | 502/328 |
| 3,472,763 | A | 10/1969 | Cosyns et al. | |
| 3,533,963 | A | 10/1970 | Senes et al. | |
| 3,791,993 | A * | 2/1974 | Rostrup-Nielsen | 502/328 |
| 3,882,636 | A | 5/1975 | Horie et al. | |
| 3,988,425 | A | 10/1976 | Jockel et al. | |
| 4,101,449 | A * | 7/1978 | Noda et al. | 502/250 |
| 4,105,591 | A | 8/1978 | Banks et al. | |
| 4,707,351 | A * | 11/1987 | Lord et al. | 423/648.1 |
| 4,863,712 | A * | 9/1989 | Twigg et al. | 423/651 |
| 4,985,231 | A | 1/1991 | Lywood | |
| 4,990,481 | A | 2/1991 | Sato et al. | |
| 5,773,589 | A | 6/1998 | Shoji et al. | |
| 6,123,913 | A * | 9/2000 | Clawson et al. | 423/652 |
| 6,280,864 | B1 * | 8/2001 | Towler et al. | 429/17 |
| 6,299,994 | B1 * | 10/2001 | Towler et al. | 429/17 |
| 2001/0009653 | A1 | 7/2001 | Clawson et al. | |
| 2002/0165417 | A1 | 11/2002 | Numaguchi et al. | |
| 2004/0077496 | A1 * | 4/2004 | Zhao et al. | 502/328 |
| 2004/0138060 | A1 * | 7/2004 | Rapier et al. | 502/302 |
| 2004/0166056 | A1 * | 8/2004 | Eyman et al. | 423/652 |

FOREIGN PATENT DOCUMENTS

| | | |
|---|---|---|
| EP | 1 241 130 A1 | 9/2002 |
| EP | 1 277 697 A2 | 1/2003 |
| FR | 1 503 959 | 12/1967 |
| GB | 969637 | 6/1961 |
| GB | 1155843 | 8/1965 |
| GB | 1150066 | 12/1965 |
| WO | 2004/011138 A1 | 2/2004 |
| WO | WO 2004/011138 A1 | 2/2004 |

* cited by examiner

*Primary Examiner*—Wayne Langel
(74) *Attorney, Agent, or Firm*—Keith D. Gourley; Bryan C. Hoke, Jr.

(57) ABSTRACT

A process for adiabatically prereforming a feedstock, includes: providing an adiabatic reactor; providing a catalyst containing 1-20 wt. % nickel and 0.4-5 wt. % potassium, wherein the catalyst has an overall catalyst porosity of 25-50% with 20-80% of the overall catalyst porosity contributed by pores having pore diameters of at least 500 Å; providing the feedstock containing natural gas and steam, wherein the natural gas contains an initial concentration of higher hydrocarbons, and a ratio of steam to natural gas in the feedstock is from 1.5:1 to 5:1; preheating the feedstock to a temperature of 300-700° C. to provide a heated feedstock; providing the heated feedstock to the reactor; and producing a product containing hydrogen, carbon monoxide, carbon dioxide, unreacted methane, and steam, wherein said product contains a reduced concentration of higher hydrocarbons less than the initial concentration of higher hydrocarbons, to prereform the feedstock.

25 Claims, No Drawings

US 7,449,167 B2

CATALYST AND PROCESS FOR IMPROVING THE ADIABATIC STEAM-REFORMING OF NATURAL GAS

BACKGROUND OF THE INVENTION

The present invention relates to prereforming of natural gas. More specifically, the invention relates to a novel use of a catalyst in the step of adiabatic steam-reforming to improve the production of hydrogen and syngas.

The steam reforming process is routinely used in the chemical processing industry to produce hydrogen or a synthesis gas comprising a mixture of hydrogen and carbon monoxide, from natural gas. The reforming process is generally carried out at a high temperature and pressure to facilitate reaction between the steam and a hydrocarbon feedstock in the presence of a nickel catalyst supported on alumina or another suitable material.

Several advancements have been made in recent years to improve the overall process economics of steam reforming. A significant amount of research has focused on developing coke resistant nickel-based catalysts. The development of coke resistant catalysts was beneficial because of the presence of higher hydrocarbons in the natural gas that were known to deactivate conventional reforming catalysts by coke formation.

Another advancement is the adoption of adiabatic prereforming, which traditionally has as its primary purpose the conversion of feedstocks that are difficult to steam reform in a fired, tubular reformer (e.g., butane, naphtha) into prereformed feeds that are easier to reform. Therefore, a number of nickel-based prereforming catalysts were developed specifically for treating heavier feedstocks.

More recently, some companies have used prereforming for a very different purpose, namely, to reduce the quantity of byproduct steam that is produced along with the primary hydrogen or syngas product. Prereformers can achieve this objective by allowing waste heat in the flue gas to be used for preheating, prereforming and reheating of the feed rather than for just preheating and steam generation. Standard prereforming catalysts, which were developed for the processing of heavier feedstocks, have been used in prereformers even if their role has shifted to that of reducing steam production with a natural gas feed.

In summary, a prereformer properly integrated with the main reformer can offer a number of benefits for prereforming natural gas including: (1) reducing the amount of byproduct steam, (2) reducing the load on the main reformer by converting a part of methane present in the feed stream, (3) reducing the possibility of coke formation on the main reformer catalyst by converting most of the higher hydrocarbons present in the feed stream, (4) reducing the ratio of steam to natural gas required for the reforming reaction, (5) providing flexibility in processing the natural gas feed from different sources, (6) providing the luxury of preheating the gaseous feed mixture to a higher temperature prior to introducing it into the main reformer, and (7) increasing the life of the catalyst and tubes in the main reformer.

Limited research has focused on the development of catalysts for prereforming natural gas. As mentioned before, conventional prereforming catalysts that were developed for treating heavier feedstocks are still used for prereforming natural gas. The conventional prereforming catalysts are microporous, have a high surface area, and contain high nickel content. They are temperature sensitive; exposure to excessive temperatures will cause sintering, carbon formation, and loss of activity. As a result, the feed gas temperature is limited to less than 550° C. because the catalyst deactivates rapidly above this temperature. The conventional catalysts are also sensitive to steaming, and therefore special procedures are required to bypass the prereformers during startup and shutdown. In addition, the catalysts require change-out every two to three years. For example, see U.S. Pat. No. 4,105,591; GB 969,637; GB 1,150,066; GB 1,155,843; U.S. Pat. No. 3,882,636; and U.S. Pat. No. 3,988,425.

Another type of nickel catalyst has been used inside fired tubular reformers for several years. This type of catalyst is exposed to temperatures considerably higher than that used in conventional prereformers. This type of catalyst contains a lower amount of nickel than conventional prereforming catalysts and is supported on calcium aluminate. Based on commercial experience, this low nickel containing catalyst deactivates much slower than commercial prereforming catalysts. This characteristic is due to the catalyst's superior resistance to sintering and breakage. However, the industry has traditionally thought of such catalysts as inappropriate for use in adiabatic prereformers because they would not have the required activity.

Despite this traditional thinking, use of a low nickel containing catalyst in an adiabatic prereforming process of light natural gas is disclosed in EP 1241130A1. The process comprises an inlet temperature of 500 to 750° C., using a catalyst containing 3 to 20% nickel on aluminum oxide or calcium aluminate support with a specific bimodal pore structure: greater than 8% porosity for 5,000 to 200,000 A pores and greater than 15% porosity for pores less than 5000 A, with a total porosity between 23% and 80%. This patent does not claim the use of a low nickel catalyst that has been promoted with an alkaline material such as potassium, and in fact it discourages the use of alkali promotion with a statement implying that alkali or potassium in the catalyst would reduce activity: "... a nickel catalyst containing an alkali component is used in a portion or all of the reformer tubes in the heating furnace. Since this catalyst improves carbon-depositing resistance at the sacrifice of activity, it has a disadvantage that a necessary amount of the catalyst is large."

U.S. Pat. Nos. 4,990,481 and 5,773,589 also use low nickel containing catalysts, but disclose only steam reforming under isothermal conditions, not adiabatic prereforming. Additionally, the catalyst in U.S. Pat. No. 4,990,481 is not promoted with an alkaline material, and neither patent discloses any benefit that would result from doing so.

Although the use of prereformers and the use of commercially available prereforming catalysts have been very effective in preventing higher hydrocarbons from entering the main reformer, it is clear that other problems with the process still exist. In particular, the operation of prereformers has been plagued by deactivation of a nickel containing catalyst, most likely due to coke formation, catalyst instability, sintering, oxidation, sulfur poisoning, or some other factors.

Accordingly, it is desired to provide a prereforming process, wherein said process does not substantially suffer from the aforementioned deficiencies of other processes. It is further desired to provide a natural gas prereforming process, wherein the performance and durability of the catalyst is improved, and to develop a catalyst specifically for the prereforming of natural gas.

All references cited herein are incorporated herein by reference in their entireties.

BRIEF SUMMARY OF THE INVENTION

A process for adiabatically prereforming a feedstock, said process comprising: providing an adiabatic reactor; providing a catalyst comprising 1 to 20 wt. % nickel and 0.4 to 5 wt. % potassium, wherein the catalyst has an overall catalyst porosity of 25 to 50% with 20 to 80% of the overall catalyst porosity contributed by pores having pore diameters of at least 500 Å; providing the feedstock comprising natural gas and steam, wherein the natural gas contains an initial concentration of higher hydrocarbons, and a ratio of steam to natural gas in the feedstock is from 1.5:1 to 5:1; preheating the feedstock to a temperature of 300 to 700° C. to provide a heated feedstock; providing the heated feedstock to the reactor; and producing a product comprising hydrogen, carbon monoxide, carbon dioxide, unreacted methane, and steam, wherein said product contains a reduced concentration of higher hydrocarbons less than the initial concentration of higher hydrocarbons, to prereform the feedstock.

Further provided is an apparatus adapted to perform the process of the invention, said apparatus comprising: an adiabatic reactor; a feed source containing natural gas and steam; valves and pipes connecting the feed source and the reactor; and a catalyst loaded in the reactor and comprising 1 to 20 wt. % nickel and 0.4 to 5 wt. % potassium, having an overall catalyst porosity of 25 to 50% with 20 to 80% of the catalyst porosity contributed by pores having pore diameters of at least 500 Å;

Still further provided is a catalyst for adiabatically prereforming a feedstock, said catalyst comprising 1 to 20 wt. % nickel and 0.4 to 5% potassium, on a calcium aluminate support, wherein the overall catalyst porosity is greater than 40% with greater than 70% of an overall catalyst porosity contributed by pores having pore diameters of at least 500 Å, the median pore diameter is greater than 2600 Å and a nitrogen BET area is less than 6.5 $m^2/g$.

DETAILED DESCRIPTION OF THE INVENTION

The present invention involves improving the life and/or performance of a catalyst used in adiabatic prereforming of natural gas containing methane and higher hydrocarbons such as ethane, propane, and butane.

Certain embodiments of the invention comprise the use of a commercially available bimodal alkali promoted reforming catalyst with certain specific properties in the step of adiabatic prereforming. Specifically, these embodiments of the invention comprise replacing a microporous, high surface area, high nickel-containing commercially available prereforming catalyst supported on calcium aluminate (e.g., 65-3R supplied by Johnson Matthey), with a macroporous, low surface area, potassium promoted, low nickel-containing catalyst supported on calcium or magnesium aluminate. The type of catalyst employed in these embodiments of this invention has been used inside certain fired tubular reformers for several years. However, the industry has always thought of such catalysts as inappropriate for use in adiabatic prereformers.

Preferably, the catalyst used in the process of this invention comprises 1 to 20 wt. % nickel and 0.4 to 5 wt. % potassium. The catalyst preferably has an overall catalyst porosity of 25 to 50%, wherein 20 to 80% of the overall catalyst porosity is contributed by pores having pore diameters of at least 500 Å, and wherein the catalyst has a median pore diameter of 1000 Å to 5000 Å. In addition, the catalyst preferably has a nitrogen BET surface area from 2 to 10 $m^2/g$.

A catalyst with these properties has a bimodal pore structure. Large diameter pores provide pathways for the reactant to enter and the products to exit the interior of a catalyst pellet. The small diameter pores provide high surface area on which to distribute the active nickel sites. The addition of potassium aids in the gasification of coke and prevents the catalyst from deactivating due to pore plugging resulting from the cracking of hydrocarbons heavier than methane. The result is a catalyst with remarkably high and stable activity at temperatures between 500 and 700° C., which is ideally suited to prereforming of natural gas. Because the internal surface area is accessible, the catalyst can be formulated as large diameter pellets and retain high utilization of the nickel catalyst (effectiveness factors). The large diameter pellet is advantageous because it reduces the pressure drop for flow through the catalyst bed. This makes the catalyst ideally suited for use in a prereforming application.

Although the catalyst used in the process of this invention can have slightly inferior activity to conventional prereforming catalysts, the catalyst used in the process of the invention can be used in adiabatic prereformers with economic advantage. Additionally, the slightly inferior activity of the catalyst of present invention can be offset by using higher prereforming temperatures. The cost of these catalysts is related to the nickel content. While the preferred catalyst of this invention has less than 20 wt. % nickel, commercial prereforming catalysts have 35 to 70 wt. % nickel. In addition, the catalyst of this invention can operate at higher temperatures than the commercial prereforming catalysts, therefore reducing the duty of the fired tubular reformer, and reducing the size and capital cost of the primary reformer. Operating a prereformer at a higher temperature also reduces sulfur chemisorption, or poisoning, on the active Ni sites, which is a problem with conventional prereforming catalysts. Another benefit provided by the catalyst of this invention results from its stability (slow loss of activity). This feature allows longer on-stream time with a smaller adiabatic prereformer. The smaller reactor means a reactor with reduced reactor and catalyst volume. Thereby, the catalyst of this invention has lower overall operating and capital costs in a hydrogen or syngas plant.

In a preferred process of the invention, natural gas containing higher hydrocarbons is mixed with steam, preheated, and prereformed in an adiabatic reactor filled with a macroporous, low surface area, potassium promoted, low nickel containing catalyst. The prereformed product contains methane, hydrogen, carbon oxides, steam and a reduced amount of unconverted higher hydrocarbons (i.e., an amount of higher hydrocarbons less than that in the natural gas feedstock). The adiabatically prereformed product is then optionally heated again and reformed further in a conventional, high temperature reformer.

In another preferred process of the invention, the catalyst described in the present invention is reduced in-situ or inside the adiabatic prereformer using a mixture of nitrogen and hydrogen gas prior to prereforming natural gas. The nitrogen and hydrogen mixture can contain hydrogen varying from 0.5 to 50%.

The feed to the adiabatic prereforming reactor contains natural gas and steam. The ratio of steam to natural gas in the feed is preferably from about 1.5:1 to about 5:1 and more preferably from about 1.5:1 to about 3:1.

The natural gas prereformed according to this invention is not particularly limited. It is pretreated in a desulfurization unit to remove sulfur, which is known to poison nickel-based catalysts used in prereformers. It is preferred to reduce the sulfur content of the natural gas feed to the prereformer to a level below about 100 ppb, and more preferably below about 30 ppb. In order to remove sulfur efficiently from the natural gas, the feed stream is mixed with up to 5% hydrogen to keep the desulfurization catalyst in a reduced and active form and to hydrodesulfurize natural gas. In some cases, the amount of hydrogen added to the feed stream entering the desulfurization reactor can be higher than 5%. The hydrogen mixed with the feed stream to the desulfurization reactor is recycled from the hydrogen recovery and purification steps in a reforming plant. As a result, a feed stream entering a prereformer contains hydrogen in addition to natural gas. The amount of hydrogen in the feed stream is preferably more than 0.2%.

Natural gas typically contains (in addition to methane) impurities in the form of higher hydrocarbons, which are hydrocarbons with more than one carbon atom, such as ethane, propane, and butane. Natural gas may also contain impurities other than hydrocarbons such as carbon dioxide, nitrogen and moisture. The typical concentration of methane in natural gas can vary from about 85% (volume or mole %) to about 99.9%. The concentration of ethane in the natural gas can vary from about 0.1 to about 10%. The concentration of propane in the natural gas can vary from about 0.1 to about 5%. Finally, the concentration of butane in the natural gas can vary from about 0.1 to about 2%.

The feed to the adiabatic, prereforming reactor is fed to the top of the reactor. A dry gas space velocity varying from about 1000/hr to about 20,000/hr can be used for prereforming natural gas. More typically, a dry gas space velocity varying from about 3,000/hr to 8,000/hr is used for prereforming natural gas.

The feed gas mixture treated in a conventional adiabatic prereformer is preheated to a temperature varying from 300 to 550° C. prior to introducing it into the prereformer. The feed gas temperature is limited to less than 550° C. because of the fact that the conventional microporous, high surface area, high nickel-containing prereforming catalyst is known to deactivate rapidly at and above this temperature. In fact, it is known to be unstable at and above this temperature in the presence of steam. On the other hand, the feed gas mixture according to certain embodiments of the present invention can be preheated to a temperature varying from 300 to 700° C. prior to introducing it into the adiabatic prereformer. It is possible to use a higher preheat temperature with catalysts described in the present invention because of the fact that the catalysts are stable at this and even higher temperatures in the presence of steam. The actual temperature used in the prereformer will depend upon the composition of the natural gas and the amount of steam in the feed mixture.

The use of higher temperature is important because it (1) increases the extent of methane conversion to hydrogen and carbon oxides in the adiabatic prereformer and (2) reduces the load on the main reformer. These are the key reasons for using the catalyst of present invention in prereforming natural gas. Consequently, a higher preheat temperature for an adiabatic prereformer can beneficially be used with catalysts of the present invention to increase the production capacity of an existing plant that can not be achieved with conventional prereforming catalysts. Alternatively, a higher preheat temperature for an adiabatic prereformer can beneficially be used with catalysts of the present invention to reduce the overall size of a new plant, thereby reducing the overall capital cost.

The adiabatic prereformer loaded with the catalyst according to the present invention can be operated throughout the pressure range. For large-scale hydrogen production, the preferred pressure can range from about 400 to 600 psia.

The catalyst used in the process according to the present invention is a low nickel containing catalyst. It comprises nickel in an elemental form, ranging from 1 to 20% by weight. More preferably, the nickel content in the catalyst ranges from about 10 to 20% by weight. The catalyst is supported on a thermally stable calcium aluminate or magnesium aluminate support.

In preferred embodiments, an alkaline earth material, such as, e.g., potassium, promotes the catalyst of the present invention. The extent of potassium promotion can vary from about 0.4 to about 5% by weight. Specifically, it can vary from about 0.4 to about 2% by weight. More specifically, the extent of potassium promotion can vary from about 0.5 to about 1.5% by weight. The extent of potassium promotion in the catalyst of the present invention is considerably higher than noted in a conventional high nickel containing prereforming catalyst.

Porosity is typically used to measure volume of pores in a catalyst. It is defined as the pore volume inside the catalyst relative to the total volume of the catalyst pellets. A catalyst with higher porosity will have higher void volume and vice versa. The catalyst used in the process of the present invention has an overall porosity as determined by mercury porosimetry varying from 25 to 50%. More preferably, it has an overall porosity varying from 30 to 50%. The porosity of a conventional high nickel containing prereforming catalyst is generally less than 20%. This means that the porosity of prereforming catalyst in the present invention is more than 25% higher than that of a conventional high nickel containing prereforming catalyst.

Prereforming catalysts used in the process of the present invention are macroporous in nature, and have a bi-modal pore size distribution. Specifically, pores equal to or greater than 500 Å in size contribute to about 20 to about 80% of the catalyst porosity. Preferably, pores equal to or greater than 500 Å in size contribute to about 40 to about 70% of the catalyst porosity. Pores that are smaller than 500 Å in size contribute the remaining porosity of the catalyst. In contrast, pores equal to or greater than 500 Å contribute less than 10% of the overall porosity in a conventional high nickel containing prereforming catalyst.

The median pore diameter determined by mercury porosimetry of prereforming catalysts of the present invention preferably ranges from about 1000 Å to about 5000 Å. More preferably, the median pore diameter ranges form 1500 Å to about 3000 Å. The median pore diameter of the prereforming catalysts of the present invention is close to two orders of magnitude higher than that of a conventional high nickel containing prereforming catalyst. The higher median pore diameter is due to the presence of large size pores in the prereforming catalysts of the present invention.

The nitrogen BET surface area of prereforming catalysts used in the process of the present invention preferably ranges from about 2 to about 10 $m^2/g$. More preferably, the nitrogen BET surface area ranges from 3 to about 8 $m^2/g$. The nitrogen BET surface area of the prereforming catalysts of the present invention is more than one order of magnitude lower than that of a conventional high nickel containing prereforming catalyst. The lower surface area is due to the reduced nickel content and the presence of large size pores in the prereforming catalysts used in the process of the present invention.

The prereforming catalysts used in the process of the present invention can be used in a wide variety of forms, including cylindrical pellets, Raschig rings and multi-hole shaped catalyst, etc. Catalysts for industrial applications are typically made in sizes ranging from about 3 mm to about 50 mm in diameter. The ideal size for any given application depends on a number of factors including, the catalyst shape and nickel loading, the operating temperature, pressure, and feed composition, and the allowable pressure drop. The catalyst pellet diameter of this invention may range from 1 mm to 50 mm, or alternatively 6 mm to 50 mm. A catalyst in a multi-hole shape with a diameter in the range from 15 mm to 25 mm and a height to diameter ratio of 0.5 to 1.2 will generally be appropriate for this application.

In addition to the commercially available catalysts with the above-described characteristics, the invention provides a novel catalyst for use in the process of the present invention to adiabatically prereform natural gas. Suitable embodiments of this novel catalyst have 1 to 20% nickel and 0.4 to 5% potassium on a calcium aluminate support, preferably, 5 to 20% nickel and 0.4 to 2% potassium, and more preferably, 10 to 20% nickel and 0.5 to 1.5% potassium. Preferred embodiments have an overall porosity greater than 40% with greater than 70% of the overall catalyst porosity contributed by pores having pore diameters of at least 500 Å. The catalysts preferably have a median pore diameter greater than 2600 Å. In addition, the catalysts preferably have a nitrogen BET area less than 6.5 m²/g.

Prereforming catalysts used in the process of the present invention can be used alone or in combination with the conventional high nickel containing prereforming catalyst. For example, a conventional prereforming catalyst can be placed at the top of the adiabatic reactor while placing a catalyst of the present invention at the bottom. In this case, the maximum operating prereforming temperatures of the adiabatic reformer will be limited to less than 550° C.

Alternatively, a prereforming catalyst of the present invention can be placed at the top of the bed while placing a conventional prereforming catalyst at the bottom. In this case, a prereforming temperature substantially higher than 550° C. can be used. This is true because the prereforming reaction is endothermic in nature, causing the temperature of the catalyst bed to drop as the prereforming gaseous mixture travels down the bed. It is, however, important to ensure that the conventional prereforming catalyst is not exposed to a temperature exceeding 550° C.

EXAMPLES

The invention will be illustrated in more detail with reference to the following Examples, but it should be understood that the present invention is not deemed to be limited thereto.

General Prereforming Experimental Procedure: A 0.375 inch inside diameter micro-reactor was used to determine the steam-methane prereforming activity of a commercially available alkali promoted reforming catalyst described in the present invention and a commercially available prereforming catalyst, 65-3R (supplied by Johnson Matthey) under prereforming operating conditions. The specific properties of a commercially available prereforming catalyst and the catalyst of the present invention used in the examples are described in Table 1.

TABLE 1

|  | Commercial Prereforming Catalyst | Catalyst of Present Invention |
|---|---|---|
| Nickel Content as Ni, % | 41.4 | 19.2 |
| Support | Ca aluminate w/some silica | Calcium aluminate |
| Potassium, % | 0.3 | 1.1 |
| Nitrogen BET area, m²/g | 146 | 6.5 |
| Median pore diameter, Å | 52 | 2554 |
| Porosity, % | 19 | 39 |
| Pores <500 Å, % of total porosity | 91.2 | 30.4 |
| Pores >500 Å, % of total porosity | 8.8 | 69.6 |

Because of the large size of catalyst pellets as received, they were crushed and sieved to an average particle size of 0.33 mm prior to using them in the micro-reactor. A small amount (0.64 g) of catalyst described in the present invention or 65-3R prereforming catalyst diluted with inert alumina particles was loaded into the reactor. The reeactor was heated close to 400° C. (set point temperature) under a flowing mixture of 50/50 nitrogen and hydrogen at a constant operating pressure of 400 psig. The catalyst was reduced or conditioned for four hours under the flow of 50/50 nitrogen and hydrogen mixture. Thereafter, flow of a mixture containing 3000 sccm of steam, 1000 sccm of pure methane and 50 sccm of hydrogen was initiated through the reactor to undergo the prereforming reaction. The prereforming reaction was carried out at three different catalyst temperatures ranging from 425 to 475° C. The product gas composition and flow rate and catalyst temperature were recorded periodically to perform the material balance and determine methane conversion and rate of reaction.

Examples 1 to 3

The general prereforming procedure described above was used to determine the activity of a commercially available prereforming catalyst (65-3R) for prereforming pure methane. An actual catalyst temperature of 435° C. resulted in 6.6% methane conversion. Table 2 tabulates the conditions and results for Examples 1 to 3.

TABLE 2

Examples 1-6.

| Example | Catalyst | Catalyst Temperature | Reforming Results (Methane Conversion, %) |
|---|---|---|---|
| 1 | Prereforming | 435° C. | 6.6% |
| 2 | Prereforming | 455° C. | 8.4% |
| 3 | Prereforming | 470° C. | 9.8% |
| 4 | Present Invention | 441° C. | 5.1% |
| 5 | Present Invention | 456° C. | 6.9% |
| 6 | Present Invention | 470° C. | 8.9% |

The data in Table 2 shows an increase in the conversion of methane with an increase in the actual catalyst temperature. The conversion at these low temperatures is low, as is the maximum conversion possible under thermodynamic equilibrium.

Examples 4 to 6

The general prereforming procedure described above was used to determine the activity of the catalyst described in the present invention for prereforming pure methane. An actual catalyst temperature of 441° C. resulted in 5.1% methane conversion. Table 2 tabulates the conditions and results for Examples 4 to 6.

Once again, the data in Table 2 showed an increase in the conversion of methane with an increase in the actual catalyst temperature. The conversion at these low temperatures is low, as is the maximum conversion possible under thermodynamic equilibrium.

Also, note that the conversion values obtained with the catalyst of present invention are somewhat lower than the values obtained with a commercial prereforming catalyst 65-3R, with both catalysts in the comminuted form. However, the conversion values noted with the catalyst of the present invention are well within the range acceptable for prereforming natural gas. Consequently, the potassium promoted reforming catalyst of the present invention is suitable for prereforming of natural gas.

While the invention has been described in detail and with reference to specific examples thereof, it will be apparent to one skilled in the art that various changes and modifications can be made therein without departing from the spirit and scope thereof.

The invention claimed is:

1. A process for adiabatically prereforming a feedstock, said process comprising:
   providing an adiabatic reactor;
   providing a catalyst comprising 1 to 20 wt. % nickel and 0.4 to 5 wt. % potassium, wherein the catalyst has an overall catalyst porosity of 25 to 50%, wherein 20 to 80% of the overall catalyst porosity is contributed by pores having pore diameters of at least 500 Å;
   providing the feedstock comprising natural gas and steam, wherein the natural gas contains an initial concentration of higher hydrocarbons, and a ratio of steam to natural gas in the feedstock is from 1.5:1 to 5:1;
   preheating the feedstock to a temperature of 300 to 700° C. to provide a heated feedstock;
   providing the heated feedstock to the adiabatic reactor; and
   producing a product comprising hydrogen, carbon monoxide, carbon dioxide, unreacted methane, and steam, wherein said product contains a reduced concentration of higher hydrocarbons less than the initial concentration of higher hydrocarbons.

2. The process of claim 1, further comprising feeding the product to a fired steam-methane reformer to further reform the product.

3. The process of claim 1, wherein the natural gas is desulfurized to a sulfur content of less than about 100 ppb before providing the feedstock to the reactor.

4. The process of claim 1, wherein the feedstock contains hydrogen gas.

5. The process of claim 4, wherein the feedstock contains more than about 0.2 mole % hydrogen gas.

6. The process of claim 1, wherein the catalyst comprises 5 to 20 wt. % nickel.

7. The process of claim 1, wherein the catalyst comprises 10 to 20 wt. % nickel.

8. The process of claim 1, wherein the catalyst is supported on calcium aluminate.

9. The process of claim 1, wherein the catalyst is supported on magnesium aluminate.

10. The process of claim 1, wherein the catalyst has an overall porosity of 30 to 45%.

11. The process of claim 1, wherein 50 to 80% of the catalyst porosity is contributed by pores having pore diameters of at least 500 Å.

12. The process of claim 1, wherein the catalyst has a median pore diameter of 1000 Å to 5000 Å.

13. The process of claim 1, wherein the catalyst has a nitrogen BET surface area from 2 to 10 m$^2$/g.

14. The process of claim 1, wherein the catalyst contains 0.4 to 2 wt. % potassium.

15. The process of claim 1, wherein the catalyst has a particle diameter from 1 mm to 50 mm.

16. The process of claim 1, wherein a mixture of nitrogen gas and hydrogen gas is provided to the reactor prior to providing the feedstock to the reactor, to reduce the catalyst inside the reactor.

17. The process of claim 16, wherein the mixture of nitrogen gas and hydrogen gas contains a concentration of hydrogen ranging from 0.5 to 50 mole %.

18. The process of claim 1, wherein an initial concentration of higher hydrocarbons in the natural gas is 1 to 15 mole %.

19. The process of claim 1, wherein the reduced concentration of higher hydrocarbons is 70% less than the initial concentration of higher hydrocarbons.

20. The process of claim 1, wherein the reduced concentration of higher hydrocarbons is 80% less than the initial concentration of higher hydrocarbons.

21. The process of claim 1, wherein the reduced concentration of higher hydrocarbons is 90% less than the initial concentration of higher hydrocarbons.

22. The process of claim 1, wherein at least one additional prereforming catalyst is included in the reactor in addition to the catalyst of claim 1.

23. The process of claim 22, wherein the additional catalyst is placed in a top portion of the reactor, above the catalyst of claim 1, and the feedstock is preheated to a temperature of 300 to 550° C. to provide a heated feedstock.

24. The process of claim 22, wherein the catalyst of claim 1 is placed in a top portion of the reactor, above the additional catalyst, and the feedstock is preheated to a temperature of 550 to 750° C. to provide a heated feedstock.

25. An apparatus adapted to perform the process of claim 1, said apparatus comprising:
   an adiabatic reactor;
   a feed source containing natural gas and steam;
   valves and pipes connecting the feed source and the adiabatic reactor; and
   a catalyst loaded in the reactor and comprising 1 to 20 wt. % nickel and 0.4 to 5 wt. % potassium, having an overall catalyst porosity of 25 to 50%, wherein 20 to 80% of the catalyst porosity is contributed by pores having pore diameters of at least 500 Å.

* * * * *